Feb. 8, 1966  L. T. DEWHIRST  3,233,927
CONDUIT MEANS
Filed March 28, 1963  2 Sheets-Sheet 1
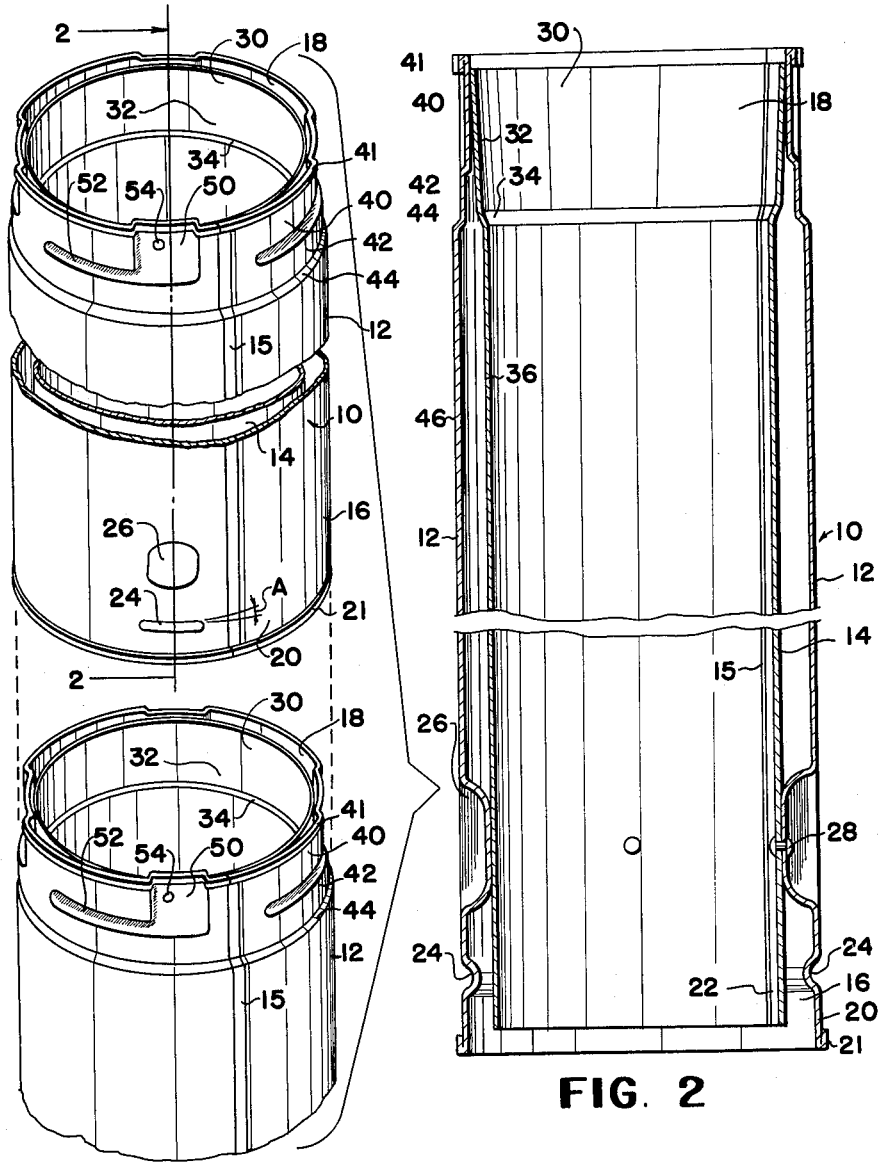
FIG. 1
FIG. 2
FIG. 5
INVENTOR.
L. T. DEWHIRST
BY 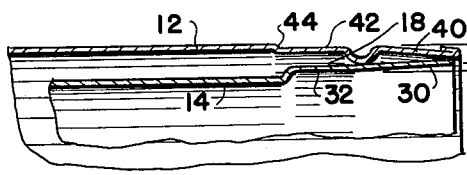
ATTORNEY Feb. 8, 1966   L. T. DEWHIRST   3,233,927
CONDUIT MEANS Filed March 28, 1963   2 Sheets-Sheet 2

INVENTOR.
L.T. DEWHIRST
BY John H. Widdowson
ATTORNEY

United States Patent Office 3,233,927
Patented Feb. 8, 1966

3,233,927
CONDUIT MEANS
Lee T. Dewhirst, 725 E. 37th St. N., P.O. Box 1138,
Wichita, Kans.
Filed Mar. 28, 1963, Ser. No. 268,789
4 Claims. (Cl. 285—401)

This invention relates to an improved conduit means. More particularly, this invention relates to multiple wall vent pipe conduits having embodied therein an improved locking connecting means. More specifically, this invention relates to gas vent pipes and conduit sections having spaced inner and outer walls and a connection means which permits the conduit sections to be securely engaged in locked relationship and provide a tight leak-proof joint.

Multiple wall conduit sections or gas vent pipes adapted to be joined together are known in the prior art. Further, different types of connecting means to secure the conduits together in a working relationship are known. However, these connecting means have not proven to be satisfactory for a variety of reasons. In general, many of the connection means for gas vent pipes known to the prior art do not secure adjacent conduit sections in a sufficiently rigid structurally strong relationship. These connection means in the conduits known to the prior art are easily deformed or bent either in assembling the conduits and/or during normal operation and use. Many of the connection means known to the prior art for connecting sections are difficult and tedious to assemble. Frequently, this assembling difficulty seriously detracts from their usefulness in applications where the conduit sections must be assembled in cramped, crowded and otherwise adverse conditions, as for example, when conduits are assembled in already existing walls or structure. Furthermore, this assembly difficulty materially increases the labor cost of installation. The connection means for connecting gas vent pipe sections known to the prior art are often expensive and difficult to produce, and it is often complicated and intricate which, in general, increases the manufacturing costs and also the installation costs. Further, in the event that the prior art pipe sections must be disassembled, either because of a structural change, or because the workman has made an error, these connection means known to the prior art are difficult to disassemble. Some of the connection means for conduit sections are provided with snap locks which are very difficult to disengage often necessitating the destruction of the conduit in order to do so. Further, many of the connections for conduit pipes known to the prior art are especially difficult to disassemble after the conduits have been in operation for some time and have either rusted or accumulations of dust and debris have built up in the joints. In such instance, the conduit sections may be rendered unusable in order to disassemble them. This, of course, is a serious waste of materials and labor. A very important shortcoming of many of the connection means of the vent pipes known to the prior art is that they fail to provide a tight relatively leak-proof joint. In general, the conduits are not held snugly together by the connection means to insure that a tight joint is formed. In order to form a relatively snug joint with conduit structures of the prior art either extreme care must be used to manufacture the conduits to close tolerances which is quite expensive, or a very complex joint involving seals, etc., must be used which is also expensive. In summary, all of the conduit connection means known to the prior art suffer from one or more of the aforementioned shortcomings.

The conduit pipe section of my invention is a double wall pipe. It has an outer wall, an inner positioned wall, spacing means for holding the inner and outer walls in spaced relationship, and a securing means constructed and adapted for maintaining the inner and outer walls in a rigid predetermined relationship. The conduit section of my invention has a female connection means on one end and a male connection means on another end. The conduit sections of my invention can be produced in any suitable form such as straight conduits, elbows, T-shaped conduits, etc. The female connection means of my new conduit section has a radially inwardly extending lug means on the outer wall. Preferably, the lug means consists of a plurality of indentations in the outer wall equally spaced about the circumference of the pipe adjacent the end thereof. Preferably, the lug means or indentation has a pitch or stated another way it is set at a slight angle to a circumferential line about the conduit. The male connection means on my conduit has an indentation means on the outer wall adjacent the end thereof. The indentation means has an entry leg portion and a locking leg portion. Preferably, the entry portion extends in a longitudinal direction and is slightly wider in width than the lug means. Preferably, the locking leg portion of my indentation means has a pitch, that is, set at a slight angle corresponding to the angle of the aforementioned lug means. Desirably, the female connection means has a frustoconical surface adapted to snugly engage the male connection means to provide a snug joint therebetween.

The new double wall conduit means of my invention overcomes the problems associated with the conduit or gas vent pipe means known to the prior art. My conduit section means, having embodied therein a new and novel connection means, can be assembled into a complete conduit that is very rigid and strong. The jointures between adjoining conduit sections of my invention are rigid and strong. Further, the conduit sections of my invention are simple and easy to assemble. They can be readily assembled in cramped, crowded areas. My conduit sections can be easily disassembled if the need arises. The conduit sections can be disassembled without mutilating the sections or any part of the joints. An important aspect of the new conduit sections of my invention relates to the fact that they can be assembled into a tight leakproof conduit. More specifically, the connection means of my conduits can be joined to form a very tight joint. The connection means of my invention pulls the adjoining sections together and then securely locks them in aligned relationship. A preferred embodiment of the vent conduit means of my invention is provided with a tapered surface which when forced together on another surface of an adjoining conduit by the locking means provides a tight relatively leakproof joint. Another important feature of my invention is that the conduit sections of my invention can be produced very inexpensively. The conduit sections embodying connection means of my invention can be stamped out and shaped by suitable apparatus, and require a very minimum of manual assembly. This of course reduces the cost of my conduit means. In accordance with the present invention, adjacent pipe sections are connected by merely pushing the sections together and then rotating one of the sections relative to the other to a locked position. This procedure not only locks the pipes securely together but it also provides a mechanical camming action which pulls the pipes together to form a very tight joint. The camming action provides a very effective mechanical advantage for pulling the pipes together to form a relatively leakproof relationship, which is very important when working in crowded or cramped areas. Thus, a superior assembly of a conduit can be achieved under the most adverse conditions.

It is an object of this invention to provide new conduit means.

Another object of this invention is to provide a double wall conduit means having an improved connection means.

Still another object of this invention is to provide a conduit section that is easy to assemble.

Still another object of this invention is to provide a conduit section that is efficient and effective in operation, but yet inexpensive to manufacture and produce.

Yet another object of this invention is to provide a conduit means having an improved connection means that is operative to form a tight leakproof joint.

Another object of this invention is to provide a gas vent pipe section having a connection means that, when assembled and in cooperation with an adjoining section, pulls the two sections together securely into a locked leakproof position.

Other objects and advantages of the invention will be apparent to those skilled in the art from the disclosure set forth herein.

Drawings of the preferred specific embodiment of the invention accompany and are a part hereof, and such are to be understood to not unduly limit the scope of the invention. In the drawings, FIG. 1 is a perspective view partly in cross section of two gas vent pipe sections of my invention shown longitudinally aligned preparatory to assembling same.

FIG. 2 is a front elevation in cross section of a conduit section of my invention, taken on line 2—2 of FIG. 1.

FIG. 5 is a fragmentary view in cross section of a portion of the female connection means of the conduit of my invention.

Figure 3:
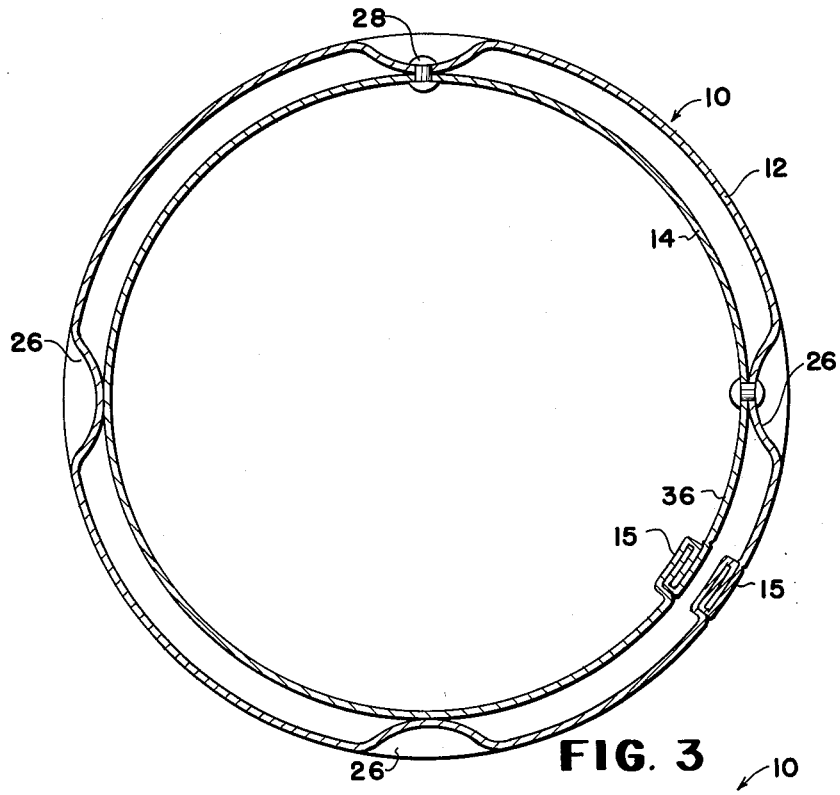
FIG. 3 is a top elevational view taken on line 3—3 of FIG. 4.

The following is a discussion and description of the new double wall conduit section of my invention made with reference to the drawings wherein the same reference numerals are used to indicate the same or similar parts and/or structure. The discussion and description are of a preferred specific embodiment of the new conduit means of my invention, and it is to be understood that such is not to unduly limit the scope of my invention.

Referring now to the drawings, FIGS. 1-5, conduit section 10 is a preferred specific embodiment of the conduit structure of my invention. The conduit 10 has a circular cross section and is comprised of an outer wall 12 of any suitable material, conveniently metal and preferably of relatively thin gauge, most preferably 28 gauge galvanized sheet metal, and an inner concentrically positioned wall 14 spaced from outer wall 12. Inner wall 14 can be made of any suitable material, metal being preferred, and is preferably made of an aluminum alloy sheet material having a minimum thickness of 0.12 inch. Both the outer wall 12 and the inner wall 14 can be formed of any other suitable materials, for example heat resistant plastics, reinforced or not. The inner and outer walls can be formed in any suitable manner. Preferably, the walls are formed from flat metallic rectangular sheets of material rolled into tubular form with the abutting longitudinal edges joined with a seam joint 15. The edges can be joined by overlapping them and joining same with securing means such as rivets. It is understood that the ends of the sheet material used to form the inner and outer walls can be secured in any other suitable manner such as welding, gluing, spot welding, etc. Further, the ends of the sheet material can also be abutted and welded or secured in any suitable manner if desired. The conduit section of my invention has a female connection means 16 on one end and a male connection means 18 on the other end. The female connection means 16 has an axially extending generally cylindrical first end portion 20 of the outer wall 12. The end of first end portion 20 is preferably rolled back forming a rolled edge 21 which serves to strengthen the end portion and also eliminate the otherwise sharp edge. The female connection means 16 also includes a cylindrically shaped second end portion 22 that is radially inwardly spaced from first end portion 20. Preferably, the end of the second end portion 22 is spaced longitudinally inwardly of the end of first end portion 20. Four equally spaced generally circumferentially extending lug indentations 24 are provided in the outer first end portion 20, spaced inwardly from the end of same. However, any suitable number of lug indentations can be provided. Further, the lugs can be formed in any suitable manner, such as for example welding a curved-shaped solid metal bar or hollow strip having a U-shaped cross section to the inside of first end portion 20. Preferably, the lug indentations have a radial depth of approximately one-half the radial spacing distance between the outer and inner walls 12 and 14, respectively. Most desirably, the longitudinal axis of the lug indentations are angled, that is, have a pitch, which is desirably from 1 to 3 degrees. Preferably, the longitudinal curved axis of lug indentations 24 is set at an angle of approximately 2 degrees to a circumferential line formed by the intersection of the wall and a plane perpendicular to the longitudinal axis of the conduit. The relative positioning of indentation lug 24 is clearly illustrated in FIG. 1 wherein the angle formed is indicated as angle $a$. The lug indentations can be of any suitable length. I have found that a length defined by the arc length subtended by an angle of approximately 29 degrees works well, and desirably in the range of 9 to 49 degrees.

Spacing means for holding the inner and outer walls 14 and 12, respectively, is provided. Any suitable spacing means can be provided, but I have found that four equally spaced dimple-shaped positioning indentations 26 in the outer wall 12 having a depth of exactly the radial distance between outer and inner walls 12 and 14 are preferred. Positioning indentations 26 are longitudinally positioned inwardly of the end of a conduit from lug indentations 24. Any suitable number of dimple-shaped positioning indentations can be provided, and they can be positioned in any suitable place on the conduit. If the conduit is extremely long, additional positioning dimples can be provided throughout its length spaced at appropriate intervals. A securing means for maintaining the inner and outer walls 14 and 12, respectively, in rigid predetermined relationship is provided. The securing means is preferably a plurality of rivets 28 in the spacing indentations extending through the outer and inner walls and holding them in a fixed relationship. I have found that two rivets positioned in adjacent dimple-spacing indentations 28 works very well and provides 360-degree stability. Any other suitable securing means can be provided such as welding, bolts, gluing, etc., as a substitute for the rivets 28, or to augment them.

The male connection means 18 provided on my conduit 10 has a frusto-conical shaped third end portion 30 on the inner wall 14, with the small end of portion 30 having an inside diameter of approximately the same as the outside of second end portion 22 on the female connection means 20. The frusto-conical shaped third end portion 30 is positioned with the larger diameter of this portion positioned at the extreme end of the inner wall 14 of the conduit 10. The frusto-conical shaped end portion 30 can have any suitable taper. I have found that a taper in the range of 1 to 3 degrees desirable, and a taper of 2 degrees, as shown on FIG. 5, indicated as angle $b$ works very well.

The male connection means 18 also has a fourth cylindrically-shaped portion 32 integrally joined to the small end of third end portion 30 and preferably has an inside diameter of approximately the same as the outside diameter of second end portion 22 of male end portion 20. A flared fifth portion 34 integrally connects fourth portion 32 and the intermediate wall portion 36 of inner wall 14. A frusto-conical shaped sixth end portion 40 on outer wall 12 is provided. Most desirably the end of end portion 40 is rolled back to form a rolled edge which serves to strengthen the end portion and also eliminate an otherwise sharp edge. The frusto-conical portion can have any suitable taper. However, I have found that a taper of 3 to 7 degrees, more preferably one of about 5 degrees works very well. The taper angle is indicated as angle c on FIG. 5. A cylindrical shaped seventh portion 42 is integrally joined to the frusto-conical shaped end portion 40. Cylindrical shaped portion 40 has an outside diameter of approximately the same as the inside diameter of the second end portion 22 of female end connection means 16. A flared eighth portion 44 is integrally joined to seventh portion 42 and to the intermediate portion 46 of the outside wall 12.

An indentation means is provided in end portion 40 to engage indentation lug 24 and thus provide a means to engage similar conduit sections in locked relationship. This indentation means has an entry leg portion and a locking leg portion. The preferred specific embodiment of this structure is shown on the drawings as four equally spaced broad longitudinally extending indentations 50 disposed in frusto-conical sixth end portion 40. Broad indentations 50 can be any suitable width. However, I have found that a width defined by the arc subtended by an angle in the range of 10 to 50 degrees, more preferably an angle of approximately 30 degrees works quite well. In general, indentations 50 should be sufficiently wide to accept indentation lug 24. It is understood that the indentations 50 can extend longitudinally or spirally if desired. The depth of indentation 50 can be of any suitable depth, however, I have found that a depth in the range of ⅛ to ¾, more preferably a depth of about one half the distance between the outer and inner walls 12 and 14 respectively works very well.

The locking leg portions of the indentation means in the male securing means are shown on the drawings as generally circumferentially extending indentations 52 spaced inwardly from the end of the sixth end portion 40. The indentations 52 are in general spaced from the end of end portion 40, the longitudinal distance of the broad indentations 50. The length of indentations 52 preferably is defined by the arc subtended by an angle preferably in the range of 10 to 80 degrees, more preferably an angle of approximately 55 degrees. The indentations 52 are preferably positioned at an angle from the circumferential line about the conduit. Preferably, the angle of the indentations 52 is in the range of 1 to 3, more preferably about 2 degrees from a circumferential line defined by the intersection of the end portion wall surface and a plane perpendicular to the longitudinal axis thereof. The positioning angle or pitch of indentation 52 should preferably be the same angle or pitch that indentations 24 are positioned.

Due to the positioning of the frusto-conical shaped portions 30 and 40, the bottom surface of broad indentations 50 contact the outer surface of end portion 30 of the inner wall 14. This relationship operates to space the inner wall 14 and outer wall 12 in the vicinity of the male connection means. Rivet means 54 which project through the third end portion 30 and sixth end portion 40 in the vicinity of the bottom surface of broad indentations 50 secure these aforementioned portions and also the associated inner and outer walls in a rigid relationship. Any suitable number of rivets or other fastening means can be provided for this purpose. It is understood that other suitable means can be provided for securing the two aforementioned end portions in fixed relationship. For example, securing means such as bolts, welding, adhesive, tabs, etc. can be used.

Figure 4:
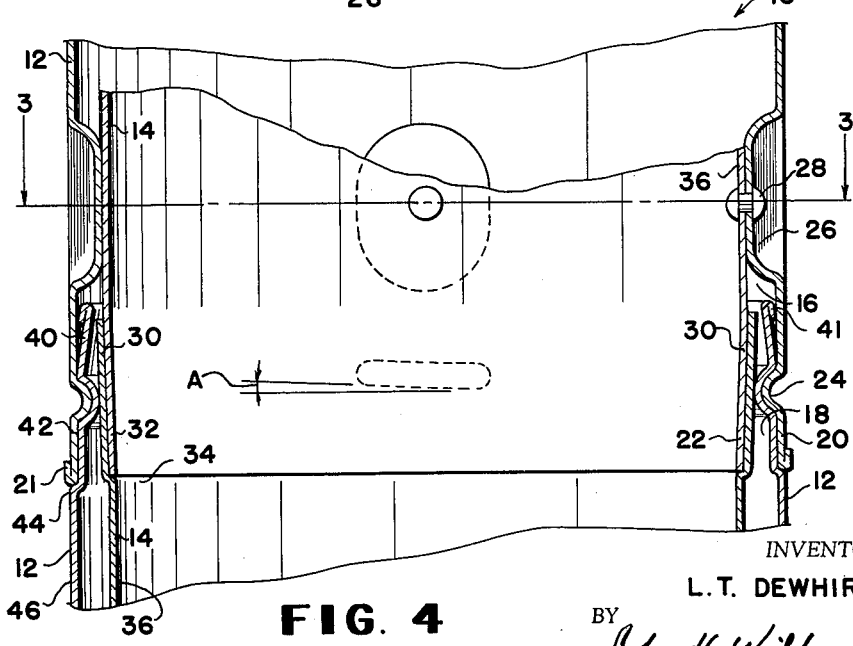
FIG. 4 is a fragmentary front elevational view showing portions of two gas vent pipe sections in assembled relation illustrating the specific details of my new connection means.

In use, conduit sections of my invention can be secured together and locked by merely aligning the male and female ends of two conduits, forcing same together, aligning indentation lugs 24 and broad indentations 50 and then turning one conduit relative to another thus forcing or twisting indentation lugs 24 in indentations 52. The locked relationship of two conduits is illustrated in FIG. 4. By providing a pitch or angle to interlocking indentations 24 and 52 it is possible to achieve mechanical leverage advantage useful in forcing the sections tightly together. The frusto-conical shaped portions of end portions 30 and 40 enable the male portion to be easily inserted in the female portion 16. Further, by providing the various aforementioned shapes to portions 30, 32 and 34 of the male connection means 18 which portions combine to form an inside cylindrical surface that progressively decreases in diameter, it is possible to obtain a very snug, tight, fit with end portion 22 of an associated conduit pipe section of my invention.

While I have described and illustrated a preferred embodiment of my invention, it is to be understood that conduit sections can be made in other forms than herein described or suggested without departing from the scope of my invention.

I claim:

1. A section of double-walled pipe having a circular cross section comprising, an outer wall, an inner concentrically positioned wall spaced from said outer wall, a female connection means on one end of said pipe, a male connection means on the other end of said pipe, said female connection means comprised of an axially extending generally cylindrically shaped first end portion of said outer wall, an axially extending radially inwardly spaced cylindrically shaped second end portion of said inner wall, a plurality of equally spaced generally circumferentially extending lug indentations in said first end portion spaced inwardly from the end of same, said lug indentations having a slight pitch, a plurality of dimple-shaped positioning indentations in said outer wall equally spaced from the circumference thereof, having a depth of exactly the spaced radial distance between said outer and inner walls, said positioning indentations contacting the outside surface of said inside wall, rivet means disposed in said spacing indentations extending through said outer and inner walls, and holding same in fixed relationship, said male connection means comprising a frusto-conical shaped third end portion on said inner wall, the small end of said frusto-conical shaped end portion having an inside diameter approximately the same as the outside diameter of said second end portion, a cylindrically shaped fourth portion of said inner wall integrally joined to the small end of said frusto-conical shaped third end portion and having an inside diameter approximately the same as the outside diameter of said second end portion, a flared fifth portion integrally connecting said cylindrical fourth portion and the intermediate wall portion of said inner wall, a frusto-conical shaped sixth end portion on said outer wall, a cylindrically shaped seventh portion integrally joined to said frusto-conical shaped sixth portion and having an outside diameter approximately the same as the inside diameter of said cylindrical first end portion, a flared eighth portion integrally joined to said seventh portion and the intermediate portion of said outside wall, a plurality of spaced, broad longitudinally extending indentations in said frusto-conical shaped sixth end portion of said outside wall, said broad indentations being of a depth of approximately one half the spacing distance between the inner and outer walls, generally circumferentially extending and spaced indentations in said sixth end portion spaced inwardly from the end thereof the distance of a longitudinal length of said broad indentations and connected to same, said last-mentioned indentations having a pitch comparable to the pitch of said indentation lugs in said first end portion, spacing means for spacing and securing said third end portion of said inner wall and said sixth end portion in rigid relationship thereof.

2. A section of double-walled pipe having a circular cross section comprising, an outer wall, an inner concentrically positioned wall spaced from said outer wall, a female connection means on one end of said pipe, a male connection means on the other end of said pipe, said female connection means comprised of an axially extending generally cylindrically shaped first end portion of said outer wall, an axially extending radially inwardly spaced cylindrically shaped second end portion of said inner wall, the end of said second end portion spaced longitudinally inwardly of the end of said first end portion, a plurality of equally spaced generally circumferentially extending lug indentations in said first end portion spaced inwardly from the end of same, said lug indentations having a pitch in the range of 1 to 3 degrees, a plurality of dimple-shaped positioning indentations in said outer wall equally spaced from the circumference thereof, having a depth of exactly the spaced radial distance between said outer and inner walls, said positioning indentations contacting the outside surface of said inside wall, rivet means disposed in said spacing indentations extending through said outer and inner walls and holding same in fixed relationship, said male connection means comprising a frusto-conical shaped third end portion on said inner wall, the small end of said frusto-conical shaped end portion having an inside diameter of approximately the same as the outside diameter of said second end portion, a cylindrically shaped fourth portion of said inner wall integrally joined to the small end of said frusto-conical shaped third end portion and having an inside diameter of approximately the same as the outside diameter of said second end portion, a flared fifth portion integrally connecting said tubular fourth portion and the intermediate wall portion of said inner wall, a frutso-conical shaped sixth end portion on said outer wall, a cylindrically shaped seventh portion integrally joined to said frusto-conical shaped sixth portion having an outside diameter of approximately the same as the inside diameter of said cylindrical first end portion, a flared eighth portion integrally joined to said seventh portion and the intermediate portion of said outside wall, a plurality of spaced, broad longitudinally extending indentations in said frusto-conical shaped sixth end portion of said outside wall, said broad indentations being of a depth of approximately one half the spacing distance between the inner and outer walls, generally circumferentially extending indentations in said sixth end portion spaced inwardly from the end thereof the distance of a longitudinal length of said broad indentations and connected to same, said last-mentioned indentations having a pitch comparable to the pitch of said indentation lugs in said first end portion, spacing means for spacing and securing said third end portion of said inner wall, and said sixth end portion in rigid relationship thereof.

3. A section of double-walled pipe having a circular cross section comprising, an outer wall of relatively thin galvanized sheet metal, an inner concentrically positioned wall of aluminum sheet metal spaced from said outer wall, a female connection means on one end of said pipe, a male connection means on the other end of said pipe, said female connection means comprised of an axially extending generally cylindrically shaped first end portion of said outer wall, an axially extending radially inwardly spaced cylindrically shaped second end portion of said inner wall, the end of said second end portion spaced longitudinally inwardly of the end of said first end portion, a plurality of spaced generally circumferentially extending lug indentations in said first end portion spaced inwardly from the end of same, said lug indentations each subtending an arc in the range of 9 to 49 degrees and having a radial depth in the range of ⅛ to ¾ of the radial spacing distance between said outer and inner walls, the longitudinal axis of said lug indentations positioned at an angle in the range of 1 to 3 degrees relative to a circumferential line formed by the intersection of the outer wall and a plane perpendicular to the axis of said pipe, a plurality of dimple-shaped positioning indentations in said outer wall spaced about the circumference thereof having a depth of exactly the spaced radial distance between said outer and inner walls, said positioning indentations axially spaced inwardly from said lug indentations, and contacting the outside surface of said inside wall, a plurality of rivet means disposed in spacing indentations extending through outer and inner walls and holding same in fixed relationship, said male connection means comprising a frusto-conical shaped third end portion on said inner wall, the small end of said frusto-conical shaped end portion having an inside diameter approximately the same as the outside diameter of said second end portion, the taper of said frusto-conical third end portion being in the range of 1 to 3 degrees, a cylindrically shaped fourth portion of said inner wall integrally joined to the small end of said frusto-conical shaped third end portion and having an inside diameter of approximately the same as the outside diameter of said second end portion, a flared fifth portion integrally connecting said tubular fourth portion and the intermediate wall portion of said inner wall, a frusto-conical shaped sixth end portion on said outer wall having a taper in the range of 3 to 7 degrees, a cylindrically shaped seventh portion integrally joined to said frusto-conical shaped sixth portion having an outside diameter of approximately the same as the inside diameter of said cylindrically shaped first end portion, a flared eighth portion integrally joined to said seventh portion and the intermediate portion of said outside wall, a plurality of spaced broad longitudinally extending indentations in said frusto-conical shaped sixth end portion of said outside wall, said broad indentations each subtending an arc defined by an angle in the range of 10 to 50 degrees, and being of a depth in the range of ⅛ to ¾ of the spacing distance between said inner and outer walls, generally circumferentially extending indentations in said sixth end portion spaced inwardly from the end thereof the distance of the longitudinal length of said broad indentations and connected to same, said circumferentially extending indentations each subtending an arc defined by an angle in the range of 10 to 80 degrees and positioned at an angle in the range of 1 to 3 degrees from a circumferential line defined by the intersection of the end portion and a plane positioned perpendicular to the longitudinal axis thereof, the bottom surface of said broad indentations intimately contacting said third end portion of said inner wall and operating to space said inner and outer walls in the vicinity of the male connection means, rivet means projecting through said third and sixth end portions in the vicinity of said broad indentations securing same in rigid relationship.

4. The section of double-walled pipe of claim 3 wherein said outer wall is made of 28 gauge galvanized sheet metal, said lug indentations subtend an arc of approximately 29 degrees and have a radial depth of approximately one half the radial spacing distance between said outer and inner walls, said longitudinal axis of said lug indentations are positioned at an angle of approximately 2 degrees, said taper of said frusto-conical third end portion is approximately 2 degrees, said frusto-conical shaped sixth end portion on said outer wall has a taper of approximately 5 degrees, said broad indentations each subtend an arc defined by an angle of approximately 30 degrees, and being of a depth of approximately one half the spacing distance between said inner and outer walls, said circumferentially extending indentations each subtend an arc defined by an angle of approximately 55 degrees and positioned at an angle of approximately 2 degrees from a circumferential line defined by the intersection of the end portion and a plane positioned perpendicular to the longitudinal axis thereof, said dimple-shaped positioning indentations are four in number and equally spaced in said outer wall, said rivet means are two in number disposed in adjacent spacing indentations, said generally circumferentially extending lug indentations in said first end portion are four in number equally spaced, and said spaced broad longitudinally extending indentations in said frusto-conical shaped sixth end portion of said outside wall are four in number equally spaced.

References Cited by the Examiner

UNITED STATES PATENTS

| | | | |
|---|---|---|---|
| 528,816 | 11/1894 | Smiley | 285—402 |
| 796,084 | 8/1905 | Orr | 285—396 |
| 1,919,001 | 7/1933 | White | 285—261 |
| 2,910,308 | 10/1959 | Carr | 285—424 |
| 2,959,196 | 11/1960 | Truesdell et al. | 285—402 |

CARL W. TOMLIN, *Primary Examiner.*